(12) United States Patent
Huebner

(10) Patent No.: US 9,695,694 B2
(45) Date of Patent: Jul. 4, 2017

(54) AIRCRAFT ENGINE BLADING

(75) Inventor: Norbert Huebner, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 846 days.

(21) Appl. No.: 13/307,793

(22) Filed: Nov. 30, 2011

(65) Prior Publication Data

US 2012/0156047 A1  Jun. 21, 2012

(30) Foreign Application Priority Data

Nov. 30, 2010  (EP) ..................... 10193067

(51) Int. Cl.
*F01D 5/14*  (2006.01)

(52) U.S. Cl.
CPC .......... *F01D 5/141* (2013.01); *F05D 2250/74* (2013.01); *Y02T 50/673* (2013.01)

(58) Field of Classification Search
CPC ............. F01D 5/20; F01D 5/141; F01D 5/147
USPC ............. 415/199.5, 124.1, 198 A, 170 R
See application file for complete search history.

(56) References Cited

U.S. PATENT DOCUMENTS

| | | | |
|---|---|---|---|
| 3,693,749 A * | 9/1972 | Motsinger et al. | 181/206 |
| 4,589,823 A * | 5/1986 | Koffel | 416/92 |
| 4,626,174 A * | 12/1986 | Sato et al. | 416/223 A |
| 4,809,498 A * | 3/1989 | Giffin et al. | 60/39.162 |
| 5,203,676 A * | 4/1993 | Ferleger et al. | 416/223 A |
| 5,277,549 A * | 1/1994 | Chen et al. | 416/223 A |
| 5,354,178 A * | 10/1994 | Ferleger et al. | 416/223 A |
| 5,740,668 A * | 4/1998 | Fujiwara et al. | 60/805 |
| 7,048,509 B2 * | 5/2006 | Tominaga et al. | 416/223 A |
| 7,090,463 B2 * | 8/2006 | Milburn et al. | 415/211.2 |
| 2002/0098082 A1 * | 7/2002 | Ito et al. | 415/191 |
| 2011/0268578 A1 * | 11/2011 | Praisner et al. | 416/241 R |

FOREIGN PATENT DOCUMENTS

| | | |
|---|---|---|
| DE | 102 02 810 A1 | 8/2003 |
| DE | 10 2008 031 781 A1 | 1/2010 |
| EP | 0924382 A2 * | 6/1999 |
| EP | 0 937 862 A2 | 8/1999 |

OTHER PUBLICATIONS

Walsh, P.P. et al. Gas Turbine Performance. Blackwell Publishing, 2004. p. 202-3. TJ778.W36.*
Terry et al. Fluid Machinery: Application, Selection, and Design. CRC Press. 2010. p. 245. TJ267.W75.*

* cited by examiner

*Primary Examiner* — Dwayne J White
*Assistant Examiner* — Kayla McCaffrey
(74) *Attorney, Agent, or Firm* — Crowell & Moring LLP

(57) ABSTRACT

A blading for a turbine, in particular a gas turbine, is disclosed. The blades of the blading in a section near the tip have a distribution ratio (t/l) of at least 0.70, in particular at least 0.9, and/or at most 0.97, in particular at most 0.95. A downstream flow angle ($\alpha$) is at most 167°, in particular at most 165°, and at least 155°, in particular at least 160°. In addition, or alternatively, an acceleration ratio ($w_2/w_1$) is at least 1.4, in particular at least 1.5.

6 Claims, 1 Drawing Sheet

AIRCRAFT ENGINE BLADING

This application claims the priority of European Patent Document No. 101 93 067.5, filed Nov. 30, 2010, the disclosure of which is expressly incorporated by reference herein.

BACKGROUND AND SUMMARY OF THE INVENTION

The invention relates to a blading for a gas turbine of an aircraft engine.

Various competing requirements must be taken into consideration in designing turbine blading of aircraft engines. In particular, a high efficiency should be achieved with low weight and low noise development. A wide variety of blading parameters influence each other, frequently in a highly nonlinear manner, so that analytically a corresponding optimization is hardly possible.

A blade row of a steam turbine is known from German Patent Document No. DE 10 2008 031 781 A1. The document cites for this distribution ratios between 0.85 and 1.1 in connection with downstream flow angles of a maximum 159° as known. Gas turbines of aircraft engines are not considered.

The present invention provides an improved blading.

An arrangement of moving blades and/or an arrangement of guide blades, in particular of one or more stages, is described as blading within the meaning of this invention. A blading according to the invention is particularly suited for high-speed gas turbines, especially high-speed low-pressure gas turbines, in aircraft engines. In a preferred embodiment, an aircraft engine has a blading according to the invention.

Some or all blades of the blading, meaning in particular some or all guide and/or moving blades of one or more stages, preferably have a distribution ratio in a section near the tip of at least 0.70 and in particular at least 0.9.

As a section near the tip, a section is described that lies near the blade tips of the moving blades, i.e., radially outside, or forms the blade tip as TIP section. Correspondingly, as a section near the root, a section is described that lies near the blade roots of the moving blades, i.e., radially inside, or defines the blade root. In particular, within the meaning of this invention a section that lies radially above a center of a radial blade height, and preferably a section in the area between 95% and 100% of the moving blade height, is described as a section near the tip, and a section that lies radially below this blade height center and preferably in the area between 0% and 5% of the moving blade height is correspondingly described as a section near the root. With both moving and guide blades, a section close to the tip correspondingly lies radially farther from a rotation axis of the turbine rotor than the blade height center, which in turn is radially farther from the rotation axis than a section near the root. In particular, a section within the meaning of this invention can lie at a radially constant height or along a flow line, i.e., with a convergent or divergent flow channel run radially inward or outward. As the blade root, the lower limit of the blade in particular is described here, the so-called platform, whereas a fastening area afterwards as necessary, which occasionally is likewise described as a blade root, is not considered since this invention deals with an optimization of the blade and the flow influenced by it.

As is standard practice, the distribution ratio is understood in particular as the quotient of a blade pitch, i.e., the distance between two blades in the circumferential direction, divided by the chord length of the blade between the blade front and rear edges.

The distribution ratio in a section near the tip of some or all blades of the blading, meaning in particular some or all guide and/or moving blades of one or more stages, preferably is at most 0.97, in particular at most 0.95. Together with the parameters according to the invention explained below, these preferred upper and lower limits for the distribution ratio in particular yield light and/or low-noise bladings with high efficiencies for aircraft engines.

According to a first aspect of this invention, a downstream flow angle of some or all blades of the blading, meaning in particular some or all guide and/or moving blades of one or more stages, at most amounts to 167°, preferably at most 165°, and at least 155°, preferably at least 160°.

As is standard practice, downstream flow angle is understood in particular as the larger of the two complementary angles between the theoretical downstream flow speed or the tangent on the suction or pressure side on the blade rear edge on the one hand and the blading circumference or a normal level to the rotation axis of the turbine on the other. The upper and lower limits according to the invention relate to the amount of the downstream flow angle, i.e., without consideration of the orientation between rotation and downstream flow direction.

If we subtract from the downstream flow angle of 90° given according to the invention, the result is the angle between the theoretical downstream flow speed or the tangent on the suction or pressure side on the blade rear edge on the one hand and the rotation axis of the turbine on the other, which occasionally is likewise defined as downstream flow angle. According to the first aspect of the present invention, this differently defined downstream flow angle accordingly amounts to at most 77°, preferably at most 75°, and at least 65°, preferably at least 70°.

According to a second aspect of this invention, which preferably can be combined with the first aspect, an acceleration ratio amounts to at least 1.4 and in particular at least 1.5. As is standard practice, acceleration ratio is understood in particular as the quotient of the amount of the theoretical downstream flow speed divided by the amount of the theoretical upstream flow speed. For example, from the mass continuity condition an estimate can be made for the channel sections between adjacent plates between channel entry and channel exit, i.e., the narrowest channel section.

The acceleration ratio can be constant over the radial blade height. In a preferred embodiment, however, in a section near the root or on the hub it is at least 1.4, in particular at least 1.5, and grows larger in the direction toward a section near the tip, preferably by a factor greater than or equal to 2.

The theoretical upstream and downstream flow speed results from the blade geometry and the fluidic boundary conditions, especially design, normal or reference operating points. The theoretical upstream and downstream flow speed can describe the vectorial speed including a radial component or also just the axial and circumferential components of a three-dimensional flow; the theoretical upstream or downstream flow speed can therefore have two (axial, circumferential-direction) or three (radial, axial and circumferential-direction) components.

Through the invention's parameter combination of upper and/or lower limit for the distribution ratio, the downstream flow angle and/or the acceleration ratio, an equally light and/or low-noise blading with a high efficiency can be provided, and particularly in a high-speed low-pressure turbine (stage).

In a preferred embodiment, some or all moving blades of one or more stages in a section near the tip have a maximum profile thickness of at most 2.5 mm and preferably at most 2 mm if these moving blades are formed as full solid blades. For hollow blades, a maximum profile thickness in a section near the tip preferably is at least 4.5 mm and at least 4 mm is preferred. With sufficient sturdiness, taking into consideration the load capacity of the blade material and depending on the material temperature, a light blading can therefore be presented.

Preferably, some or all guide blades of one or more stages in a section of the tip have a maximum profile thickness of at most 10 mm and preferably at most 9 mm. Advantageously, the guide blades are formed as full solid blades. The limitation of the maximum profile thickness advantageously takes into account the thermal fatigue.

In a preferred embodiment, some or all moving blades of one or more stages have at least one seal tip, preferably two or more seal tips each. Advantageously, an abradable lining on the turbine housing is arranged radially opposite the tips.

Preferably, the degree of reaction of a blading according to the invention is at least 0.35 and preferably at least 0.4. In addition, or alternatively, the degree of reaction is at most 0.6 and preferably at most 0.55. As is standard practice, degree of reaction can be defined in particular as the ratio of the enthalpy converted into flow energy and mechanical work in the moving blades of a turbine stage to the total, in particular isentropic enthalpy gradient of the turbine stage. Equally, the degree of reaction within the meaning of this invention can be defined by the so-called pressure degree of reaction that gives the ratio of the specific flow work in the rotor to the specific flow work between stage entry and exit. Depending on approximation of the static change of state by a polytrope or isentrope and isobar, this can involve in particular the polytropic or isotropic pressure degree of reaction. Preferably, the degree of reaction is formed with the static pressures and results as the quotient of the difference of the static pressure in the moving row divided by the difference of the static pressure in the entire stage from guide and moving rows.

In a preferred embodiment, the profile sections are threaded radially over the center of gravity, which yields a favorable blading in terms of design, flow, and structural mechanics. A slight axial offset of the profile section, meaning an axially slightly beveled blade, is also understood as threaded radially over the center of gravity within the meaning of this invention.

Preferably, a theoretical stagnation point flow line meets the blade profile in the area of the front edge radius. The theoretical stagnation point flow line is defined in particular by the flow line ending in the stagnation point in a theoretical design flow.

In a preferred embodiment, the rotational frequency of moving blades of the blading in one or more noise work points is at least 6000 Hz, in particular at least 6300 Hz. The nominal speed in a noise work point and the minimum rotational frequency yield the minimum necessary moving blade number of such a preferred embodiment. As is standard practice, a noise work point for an aircraft engine can be defined in a specification, and in particular specify an altitude, speed, and the like.

Further features and advantages result from the detailed description and Figures.

DETAILED DESCRIPTION OF THE DRAWINGS

Figure 1:
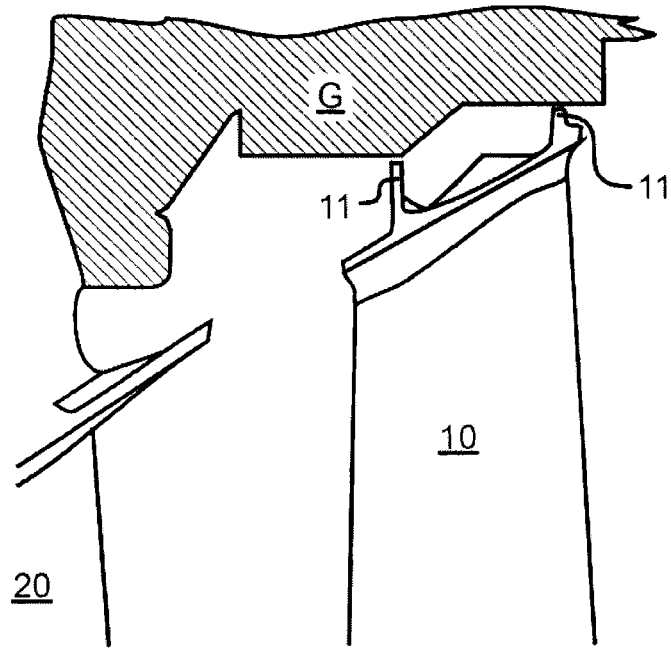
FIG. 1 illustrates a part of an axial section of a blading according to an embodiment of the invention.

FIG. 1 shows a part of an axial section of a blading, where the rotation axis is indicated by the dotted line, with a part of a moving blade 10 with two seal tips 11, which lie opposite an abradable lining of a turbine housing G, as well as a part of the preceding guide blade 20. This is a high-speed low-pressure turbine of an aircraft engine not presented in further detail.

Figure 2:
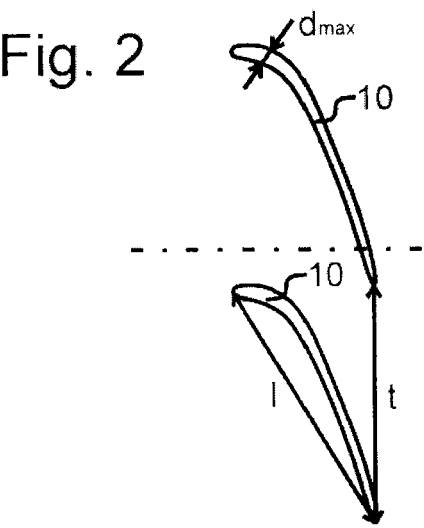
FIG. 2 illustrates moving blade sections of a blading according to an embodiment of the invention.
Figure 3:
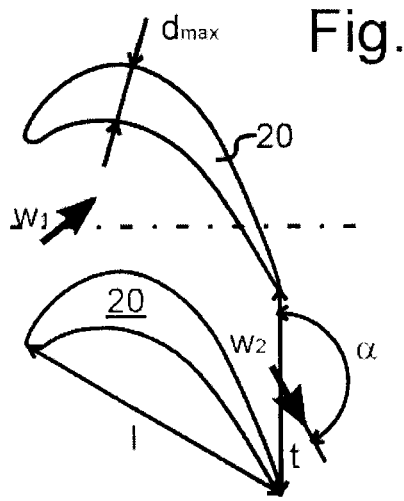
FIG. 3 illustrates guide blade sections of a blading according to an embodiment of the invention.

FIGS. 2 and 3 show a developed view of moving (FIG. 2) and guide (FIG. 3) blade sections in the circumferential direction. The rotation axis of the turbine is again shown by a dotted line, thus, the circumferential direction runs correspondingly vertically in FIGS. 2 and 3.

In FIG. 2, the example of the moving blades 10 is used to show the pitch t, i.e., the distance between adjacent blades in a circumferential direction, the chord length l between the blade front and rear edges, as well as the maximum profile thickness $d_{max}$; in FIG. 3 the example of the guide blades 20 is used to show the theoretical upstream flow speed $w_1$, the downstream flow speed $w_2$, and the downstream flow angle defined by these against the circumferential direction. This can equally involve a section near the tip, in particular a TIP section (above in FIG. 1), or a section near the root.

In the embodiment, the guide 20 and moving blades 10 in a section near the tip have a distribution ratio t/l of 0.92. The downstream flow angle α is at most 162°, the maximum profile thickness $d_{max}$ of the moving blades 10 is two millimeters, and that of the guide solid blades 20 is nine millimeters.

The acceleration ratio $w_2/w_1$ in a section near the root is 1.5 and increases radially to the section near the tip cited above.

The degree of reaction of the blading over the blade height is 0.5. The profile sections of the moving blades are threaded radially over the center of gravity (not shown).

REFERENCE SIGN LIST 10 moving blade
11 seal tip
20 guide blade
G housing
l chord length
t blade pitch
w flow rate
α downstream flow angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A blading for a gas turbine of an aircraft engine, comprising:

blades, wherein at least one of the blades has a distribution ratio (t/l) in an area between 95% and 100% of a height of the at least one of the blades that is at least 0.90 and at most 0.97, a downstream flow angle ($\alpha$) that is at least 160° and at most 167°, and an acceleration ratio ($w_2/w_1$) of at least 1.4 in an area between 0% and 5% of the height of the at least one of the blades and grows larger in a direction toward the area between 95% and 100% of the height of the at least one of the blades by a factor greater than or equal to 2.

2. The blading according to claim 1, wherein moving blades of the blades of the blading each have at least one seal tip.

3. The blading according to claim 1, wherein a degree of reaction of the blading is at least 0.35 and/or at most 0.6.

4. The blading according to claim 1, wherein profile sections of the moving blades of the blading are threaded radially over a center of gravity.

5. The blading according to claim 1, wherein a stagnation point flow line to a blade front edge meets a blade profile in an area of a front edge radius.

6. An aircraft engine with a blading according to claim 1, wherein the blading is arranged in a high-speed low-pressure turbine.

* * * * *